United States Patent [19]

Witt

[11] Patent Number: 4,482,326

[45] Date of Patent: Nov. 13, 1984

[54] FLIGHT TRAINING GLASSES

[75] Inventor: Frank Witt, Columbia, S.C.

[73] Assignee: Instrument Flight Research Inc., West Columbia, S.C.

[21] Appl. No.: 343,017

[22] Filed: Jan. 26, 1982

[51] Int. Cl.³ .............................................. G09B 9/00
[52] U.S. Cl. ...................................... 434/36; 434/41; 358/103; 340/716; 340/331 R
[58] Field of Search .................... 434/21, 22, 36, 41, 434/43; 350/331 R, 346, 352; 340/703, 713, 716, 784; 250/203 L; 235/411; 358/103, 107, 109, 113; 2/6, 8

[56] References Cited

U.S. PATENT DOCUMENTS

| 3,205,303 | 9/1965 | Bradley | 358/210 |
|---|---|---|---|
| 3,898,747 | 8/1975 | Marshall | 434/22 |
| 3,917,412 | 11/1975 | Stoutmeyer et al. | 250/203 R |
| 4,016,658 | 4/1977 | Porter et al. | 434/41 |
| 4,063,368 | 12/1977 | McFarland | 434/22 |
| 4,106,217 | 8/1978 | Witt | 434/36 |
| 4,152,846 | 5/1979 | Witt | 434/36 |

Primary Examiner—Vance Y. Hum
Assistant Examiner—Leo P. Picard
Attorney, Agent, or Firm—Allegretti, Newitt, Witcoff & McAndrews, Ltd.

[57] ABSTRACT

A pair of flight training glasses having improved position sensor comprised of a pair of non-parallel photocells for preventing monitoring error. An improved lens in the glasse has a plurality of segmented portions independently controllable for affecting view sizing and for simulating various cloud conditions during aircraft flight.

7 Claims, 11 Drawing Figures

FLIGHT TRAINING GLASSES

BACKGROUND OF THE INVENTION

The present invention relates generally to training equipment for pilots and more particularly to improved instrument flight training glasses.

Instrument flight training requires that the vision of the student pilot be restricted. That is, the student pilot's vision must be restricted to the instrument panel within the cockpit.

An effective pair of instrument flight training glasses is shown in U.S. Pat. No. 4,152,846 ("the Witt patent"), shown the teachings thereof are incorporated herein by reference. The Witt patent discloses a bistable voltage-controlled lens having a first transparent state and a second opaque, non-transparent state. The lens, a liquid crystal, includes a normally permanent sight-restricting upper portion and the voltage-controlled portion therebelow. The voltage-controlled portion extends the entire width of the lens.

The state of the bi-focal voltage-controlled lens is controlled by a position sensor which includes an ambient photocell and a directional photocell. As the student pilot raises his head in an attempt to look through the windshield, the position sensor responds and opaques the lower voltage-controlled lens portion. More particularly, as the head is raised from the instrument panel to the windshield, or when any outside viewing is attempted, the directional photocell in conjunction with the ambient photocell senses an increase in light, and the position sensor responsively switches the lens from the transparent state to the opaque state.

SUMMARY OF THE INVENTION

In one principal aspect, the present invention is an improved position sensor. The improvement includes a pair of directional photocells and comparator circuitry for interconnecting the directional photocells with the ambient photocell and for providing an opaquing signal under predeterminded conditions. In response to the opaquing signal, the voltage-controlled lens switches to the opaque state.

An inherent disadvantage of the instrument flight training glasses disclosed in the Witt patent, becomes evident during use in cockpits wherein the windshield is divided by a vertical support strut. If, as the student pilot raises his head, the single directional photocell is focused onto the support strut, the position sensor may not respond in the proper fashion, such that windshield vision is permitted rather than prohibited.

The improved position sensor substantially avoids this deficiency. The two directional photocells are oriented such that their operational axes are non-parallel. With this orientation or configuration, focus upon a single point or object within the cockpit is substantially avoided.

In another principal aspect, the present invention is an improved lens configuration. With the training glasses disclosed in the Witt patent, the student pilot can, by slight rotation of the head about a vertical axis, obtain substantial peripheral vision through the lower voltage-controlled lens portion.

The improved lens configuration includes a vision-restricting portion and a voltage-controlled portion, which cooperatively define a viewing window in the lower, inner quadrant of the lens. In other words, the two portions define a boundary therebetween having a vertical component and a horizontal component.

The vertical boundary component prohibits peripheral vision without a major head turn. With such a head turn, the directional photocells will sense an increase in light and opaque the viewing window.

In a third principal aspect, the present invention includes a voltage-controlled lens portion defining a window in the lower, inner quadrant and means are provided for selectively enlarging the viewing window. This permits the window to be adjusted in accordance with the distance between the head of the student pilot and the instrument panel and the required viewing area within the cockpit without excessive head movement.

It is thus an object of the present invention to provide improved instrument flight training glasses. Another object is to provide a pair of instrument flight training glasses of the type disclosed in the Witt patent, wherein the position sensor is less sensitive, in a directional sense, to aircraft hardware and resulting variations in light intensity. Still another object is a position sensor for flight training glasses including a pair of directional photocells positioned for preventing non-operation of the glasses caused by one photocell "looking" at a windshield support or other viewing obstruction at window level.

It is a further object of the present invention to provide an improved lens for flight training glasses. It is also an object to provide a flight training lens of the type shown in the Witt patent, wherein the voltage-controlled portion is limited to the lower, inner quadrant of the lens to substantially avoid peripheral vision therethrough.

Another object is an improved lens for a flight training apparatus wherein the voltage-controlled lens portion defines a variably-sized viewing window.

These and other objects, features and advantages of the present invention are described or apparent in the following detailed description.

BRIEF DESCRIPTION OF THE DRAWINGS

Preferred embodiments of the present invention are described herein with reference to the drawings wherein.

DESCRIPTION OF THE PREFERRED EMBODIMENT

Figure 1:
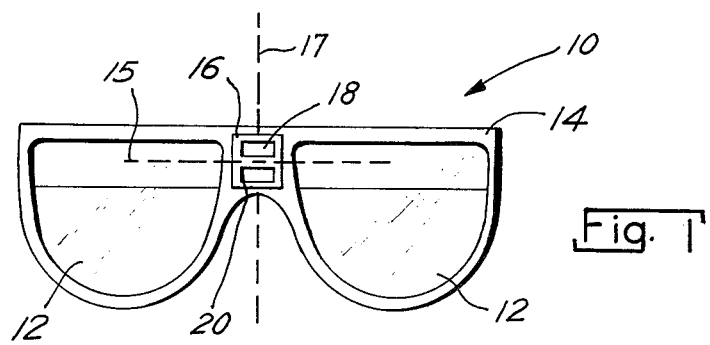
FIG. 1 is a front view of a pair of instrument flight training glasses, as shown in the Witt patent and is an example of the prior art.

Referring to FIG. 1, there is illustrated a pair of instrument flight training glasses 10, as disclosed and claimed in the Witt patent. The glasses 10 include a pair of liquid crystal lenses 12, mounted in a frame 14. The glasses 10 further include a position sensor 16, which, in turn, includes an ambient photocell 18 and a singular directional photocell 20. The directional photocell operates to monitor light received from a selected direction.

The position sensor 16 serves to indicate the relative position of the glasses with respect to permitted lines of sight of the wearer. The position sensor signals a switching circuitry (not shown) for actuating the lenses to their opaque state when the flight glasses are in a position to permit the operator to view outside the aircraft. When the glasses are in such a position, the directional photocell will be monitoring a greater light intensity, relative to the ambient light, than when the glasses are directed, for example, to the instrument panel of the aircraft.

Figure 2:
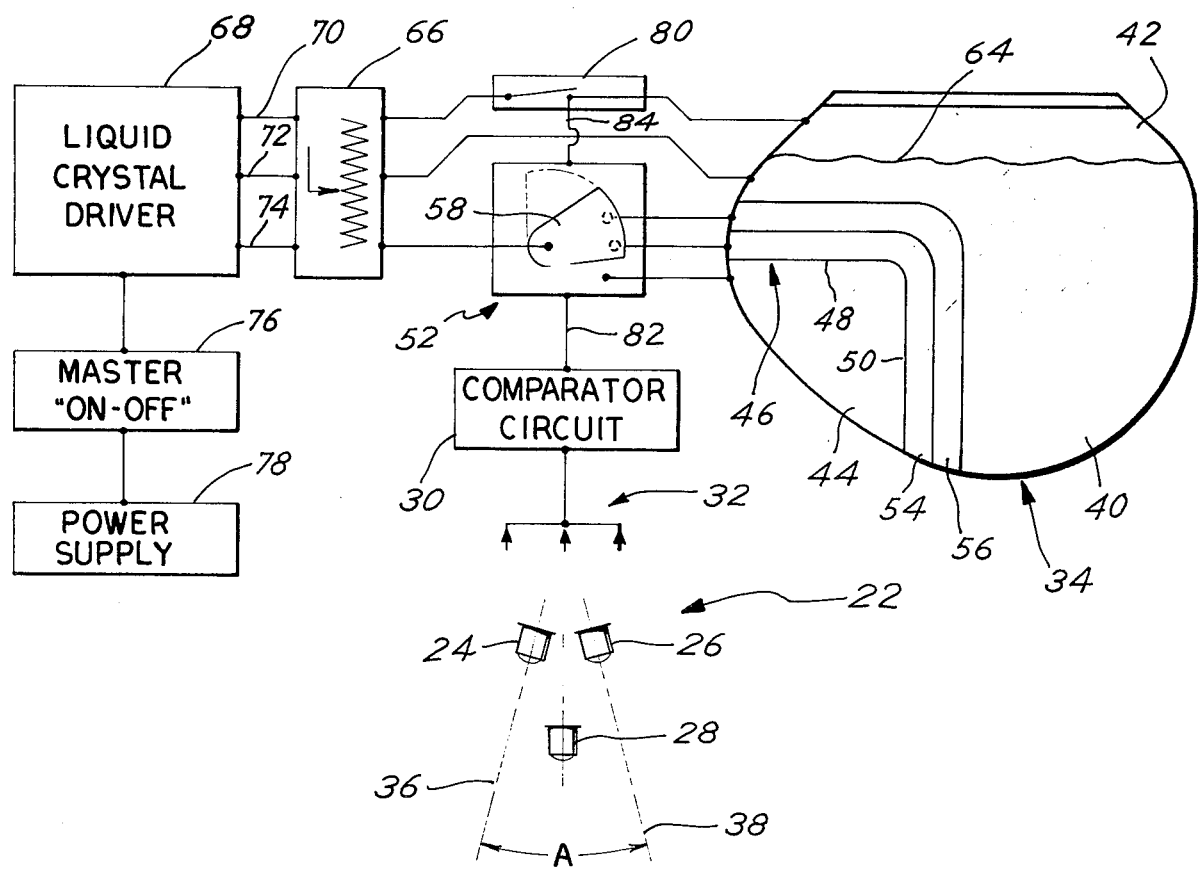
FIG. 2 is a schematic view of an improved circuit and improved lens (left side) for use in glasses of the type illustrated in FIG. 1.

Referring to FIG. 2, a first aspect of the preferred embodiment of the present invention is shown with an improved position sensor 22 for use in a pair of flight glasses. The improved position sensor 22 includes a pair of directional photocells 24, 26 and an ambient photocell 28. The position sensor may be rotatably mounted as a unit to the frames of the glasses by a suitable means (not shown) so that the sensor may be initially positioned relative to a horizontal and a vertical axis 15, 17 (FIG. 1) by the student pilot.

A conventional comparator circuit 30 is interconnected to ambient photocell 28 and directional photocells 24, 26, as indicated diagrammatically by bus 32. The comparator circuit receives first and second directional signals from the two directional photocells 24, 26, respectively, and an ambient signal from the ambient photocell 28.

Comparator circuit 30 provides an opaquing signal under predetermined conditions. In this preferred embodiment, an opaquing signal is issued whenever either one of the directional signals changes relative to the ambient signal. In response to the opaquing signal, a liquid crystal lens 34 switches to an opaque state.

Directional photocells 24, 26 operate in a substantially coplaner fashion about a horizontal and vertical mounting axis. Thus, as the student pilot raises or lower his head, or moves his head from side to side, directonal photocells 24, 26 track the head movement.

With respect to the operational directions (shown by the dashed lines in FIG. 2), directional photocells 24, 26 have a non-parallel orientation on respective axes 36, 38. Preferably, the angle (arrows "A") of divergence is sufficient to prohibit simultaneous outputs from photocells 24, 26 when one such photocell is directed toward a window level obstruction. For example, five to ten degrees of divergence should be sufficient in most cases. The physical displacement between photocells 24, 26 is preferably between one-half centimeter and two centimeters. However, it should also be noted that dual directional photocells could be mounted on parallel operational axes, if the axes are spaced in accordance with the profile presented by the potential obstruction.

The improved position sensor 22 substantially avoids the possibility of unauthorized window vision possible with the glasses of FIG. 1 where the singular directional photocell 20 is directed towards a portion of aircraft structure, such as a windshield strut. That is, with the non-parallel photocells 24, 26, the improved sensor 22 cannot be focused in a single direction or upon a single object within the craft. As such, at least one of the directional photocells 24 or 26 will be directed through the window of the aircraft.

Referring again to FIG. 2, additional aspects of the present invention are shown in an improved liquid crystal lens 34 (left lens only being shown). The improved lens 34 is divided into two cloud coverage simulation segments 40, 42, with simulation segment 40 including an instrument panel viewing window 44. Window 44 is substantially traingular in shape as shown.

The portion of simulation segment 40 which does not include window 44 is the vision-restricting portion of segment 40. As used herein, the term "vision-restricting" relates to any means whereby vision of the pilot is checked. For example, the segments 40, 42 not including window 44 may be permanently opaqued by a coating on the lens 34 or may be non-permanently opaqued by a voltage-controlled liquid crystal. Preferably, a signal-controlled liquid crystal is utilized which is operable in various degrees of opacity. The latter represents the preferred embodiment of the present invention, since it may be used to provide a "breaking out" of cloud coverage simulation as in an instrument approach to landing.

As shown, viewing window 44 is defined by a boundary 46. The viewing window 44 is in the lower, inner quadrant of the lens 34, as viewed by an observer on the student pilot, and is frontal with respect to the student pilot. The viewing window 44 permits substantially only forward and somewhat downward vision. The boundary 46 has a substantially horizontal upper boundary portion 48 which checks the wearer's upward vision and a substantially vertical side boundary portion 50 which checks the wearer's side viewing. Boundary 50 on the left lens checks left side viewing and boundary 50 on the right lens (not shown) checks right side viewing. The "checking" operates to discontinue eyeball rotation at a certain eyeball position and to engage movement of the wearer's neck for further extended viewing in that direction.

Although the described viewing window 44 and boundary 46 are preferred, it should be understood that different configurations of window 44 are possible so long as the viewing window 44 remains substantially frontal and an upper boundary checks upward viewing and a side boundary checks side viewing.

A third aspect of the present invention is also shown in FIG. 2 on the improved lens 34. The windows 44 in the pair of lenses of the flight glasses, should permit observation of the entire instrument panel with a head rotation of less than thirty degrees. A switch, generally designated 52, selectively varies the size of the viewing window 44 to accomodate and adjust for different distances between the pilot and the instrument panel. The closer the pilot is to the instrument panel, the larger the viewing window 44 must be provide the preferred observation parameter. Also, some aircraft are wider than others, and sometimes within the same type aircraft the instrument configurations are slightly different.

As taught in the Witt patent, each voltage-controlled portion of the lens is defined by a transparent electrode coating on the lens. In this preferred embodiment, the lens 34 includes five separate and distinct electrode coatings. The first and second electrode coatings define the cloud coverage simulation segments 42, 40 (not portions 44, 54, 56); the third coating defines the viewing window 44, and the fourth and fifth coatings define window enlarging lens portions 54,56. As shown, each enlargening lens portion 54, 56 is substantially adjacent to the window for extending the window upwardly and outwardly.

Switch 52 further includes a selector 58 for selectively integrating either lens portion 54 with window 44 or integrating both lens portions 54, 56 with a window 44. Selector 58 is represented by the diagram form shown in FIG. 2. As understood, the electrode coatings of enlargening segments 54, 56 are electrically connected to operate in opacity as like the window 44 or as like the remaining portion of lens segment 40, in accordance with the position of selector 58. That is, the enlargening segments 54, 56 may act with the viewing window 44 by remaining clear when the head is down and going opaque when the head is raised, or the enlargening segments may act with cloud coverage simulation segments 40, 42 by remaing opaque. Selector 58 may be manually or electrically switched as desired.

Figure 3:
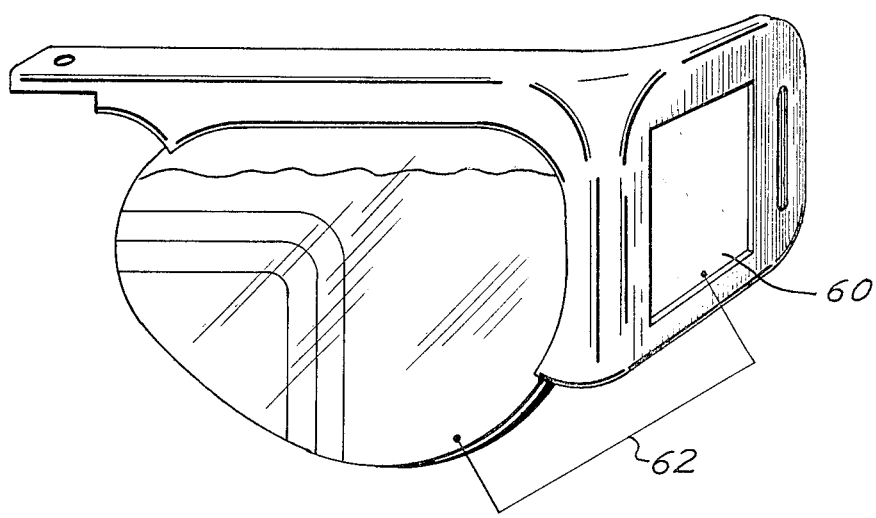
FIG. 3 is a pictorial view of a pair of flight glasses having the lens of FIG. 2 as well as a side lens.

As shown in FIG. 3, an embodiment of the flight glasses may include a side window 60, if desired. This side window 60 further restricts and substantially reduces peripheral vision and may be used with the one-piece, straight, rigid frontal lens frame of FIG. 1. Side windows 60 may not be necessary where the frames are in two pieces, being hinged together at the nose bridge such that lenses 34 extend back along the sides of the eyes of the wearer. Also, lenses 34 may be curved in order to wrap around the sides of the wearer's eyes. As illustrated in FIG. 3 by conductors 62, side window 60 is electrically operated for providing an opaque state in conjunction with the state of lens segment 40, not including window 44.

FIGS. 4, 5, 6 and 7 illustrate examples of cloud coverage simulation which may be performed by the preferred embodiment. The two lens segments 40, 42 (FIG. 2) are divided by a billowy horizontal line 64 to provide for three distinct aircraft/cloud simulations: (1) aircraft on top of a cloud layer; (2) aircraft inside a cloud layer; and (3) aircraft below a cloud layer. Assembly of these three distinct simulations are illustrated in FIGS. 4 through 7.

Lens A of FIGS. 4 through 7 illustrates the state of the lens when the wearer is viewing the instrument control panel of the aircraft. In this viewing state A, window 44 is clear to permit the wearer to view the control panel. Lens B of FIGS. 4 through 7 illustrates the state of the lenses when the wearer is viewing through a window of the aircraft. FIGS. 4 through 7 also illustrate when one or two or none of the enlargening lens portions 54, 56 are actuated.

Figure 4:
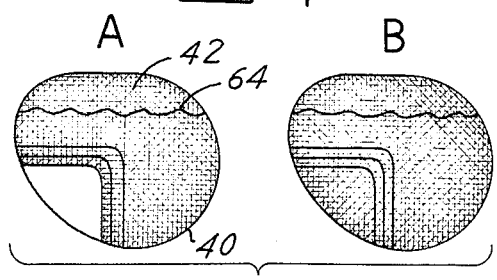
FIG. 4 is a front view of the lens of FIG. 2, in its "inside cloud, zero visibility state"; A is the head down configuration and B is the head up configuration.
Figure 5:
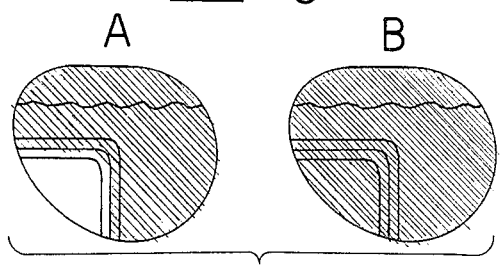
FIG. 5 is a front view of the lens of FIG. 2, in its "inside cloud, partial visibility state"; A is the head down configuration and B is the head up configuration.

FIGS. 4 and 5 show the state of the lenses when the aircraft is inside the cloud layer. In this simulation, both upper and lower lens segments 40, 42 are set for a predetermined opacity to simulate cloud density and thus visibility. The particular opacity level may vary with time in order to simulate varying cloud densities. The opacity is variable by a potentiometer circuit 66 (FIG. 2) which may be manually actuated, if desired, to permit a trainer co-pilot to manually vary the opacity of the flight glasses worn by the student pilot. Reference is made to U.S. Pat. No. 4,106,217, incorporated herein by reference, which illustrates a control box having a plurality of separate knob adjustments, which is held by the trainer pilot during student training. As will suggest itself, potentiometer circuit 66 may be automatically adjusted by a varying electrical signal generated by a conventional signal waveform generator. As also illustrated in FIG. 2, the circuitry further includes a liquid crystal driver 68, similar to the drivers described in the last named patent, for providing the necessary voltage waveform to switch liquid crystal lens 34. Three drivers may be utilized to generate waveforms along leads 70, 72, 74 in order to provide independent waveforms to lens portions 40, 42, 44 to clear or opaque the respective portion. The three waveforms, however, pass through potentiometer 66 which may include three separate potentiometers for each of the waveforms. These potentiometers may be set by the operator in order to provide the lens states as shown by FIGS. 4 through 7. As understood, the comparator circuit 30 overrides the waveform appearing along lead 74 in order to clear window 44 for instrument viewing. A master ON-OFF switch 75 as well as power supply 78 are also illustrated in FIG. 2.

Figure 6:
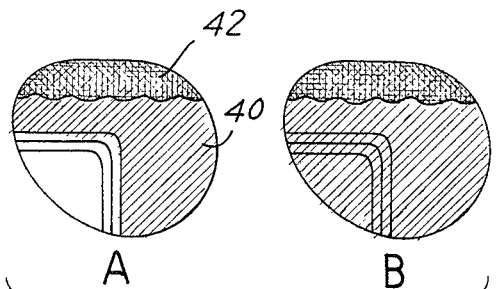
FIG. 6 is a front view of the lens of FIG. 2, in its "under a cloud layer, partial visibility state"; A is the head down configuration and B is the head up configuration.

FIG. 6 illustrates a below the cloud layer state of lens segments 40, 42. Upper lens segment 42 is driven to an 100% opacity state, whereas lower lens segment 40 is driven to a lower opacity state for providing a predetermined visibility.

Figure 7:
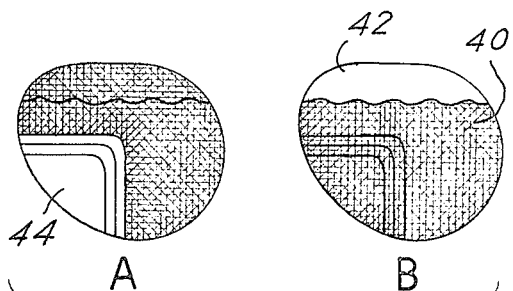
FIG. 7 is a front view of the lens of FIG. 2 in its "above a cloud layer, unlimited visibility state"; A is the head down configuration and B is the head up configuration.

FIG. 7 illustrates the state of lens segment 40, 42 for illustrating aircraft on the top of the cloud layer. The upper segment 42 is clear when the wearer views through the window 44 (FIG. 7B) and the upper segment is driven to an opaque state when the wearer returns his vision to the instrument control panel (FIG. 7A). Since upper segment 42 switches transparent in direct opposition to window 44, a switch 80 is utilized under control of comparator circuit 30. The output signal of comparator 30 along lead 82 causes a signal to appear on lead 84 to close or open switch 80. When comparator circuit 30 causes window 44 to become transparent, switch 80 is closed for passing the waveform of lead 70 onto lens segment 42 driving the segment opaque. When window 44 is opaque, the signal on lead 84 permits switch 80 to be open causing lens segment 42 to go transparent. This is shown in FIGS. 7A, 7B. As will suggest itself, lead 82 may be directly connected to lead 84 depending upon the particular switch structure used for switch 80. Switch 80 may be of the type to require conventional amplifying or inverting circuitry between leads 82, 84 in order to provide the proper control signal to the particular switch 80 being utilized.

Such cloud simulations of FIGS. 4 through 7 permit the user pilot to feel as if he were flying on top of a cloud layer, beneath a cloud layer as well as within a cloud layer. The ability of the lens segments to be controlled by a potentiometer permits the instructor pilot to change the degree of opacity for providing random visibility simulations, the pattern of which is unknown to the student pilot.

It should be understood, of course, that the foregoing disclosure relates to preferred embodiments of the invention and that other modifications or alterations may be made therein without departing from the spirit or scope of the invention as set forth in the appended claims.

What is claimed is:

1. A pair of instrument flight training glasses for being worn by a student pilot including: a frame structure for mounting onto the head of the student pilot; a position sensor mounted to said frame structure; and a voltage controlled lens mounted to said frame structure;

A. said position sensor comprised of:
1. a pair of directional photocells to provide respective first and second directional signals, each directional signal having a signal level indicative of monitored level of light;
2. an ambient photocell to provide a threshold signal level to be compared with the signal level of said directional signals; and
3. a comparator circuit connected with said directional photocells and said ambient photocell for generating a control signal responsive to at least one of the signal levels of said photocells reaching said threshold signal level; and B. said voltage controlled lens switching from a state of transparency to a state of opacity in response to said control signal whereby the glasses maintain operation despite obstruction of monitored light of one of said photocells.

2. In a device as defined in claim 1, wherein said voltage controlled lens has a viewing window substantially triangular in shape, having substantially vertical and horizontal boundary components, and located in the lower and inward quadrant of the lens.

3. In a device as defined in claim 1, wherein said voltage controlled lens has at least one enlargening segment juxtaposed with said viewing window for selective enlargement thereof.

4. In a device as defined in claim 1, wherein said voltage controlled lens has upper and lower lens portions divided by a billowy line to provide for cloud simulations.

5. In a device as defined in claim 1, wherein said voltage controlled lens has an auxiliary lens electrically connected therewith and located substantially perpendicular to and on the outside of said voltage controlled lens.

6. In a device as defined in claim 1, wherein said voltage controlled lens is further controlled by a potentiometer to provide degrees of opacity for varius visibility simulations.

7. In a device as defined in claim 1, wherein said position sensor is movably connected to said frame structure so that said sensor may be initially positioned about horizontal and vertical axis by the student pilot.

* * * * *